Jan. 28, 1930.　　　C. F. CAPELL　　　1,745,244
CONTROLLING MECHANISM FOR SIGNALS
Filed April 1, 1929　　2 Sheets-Sheet 1
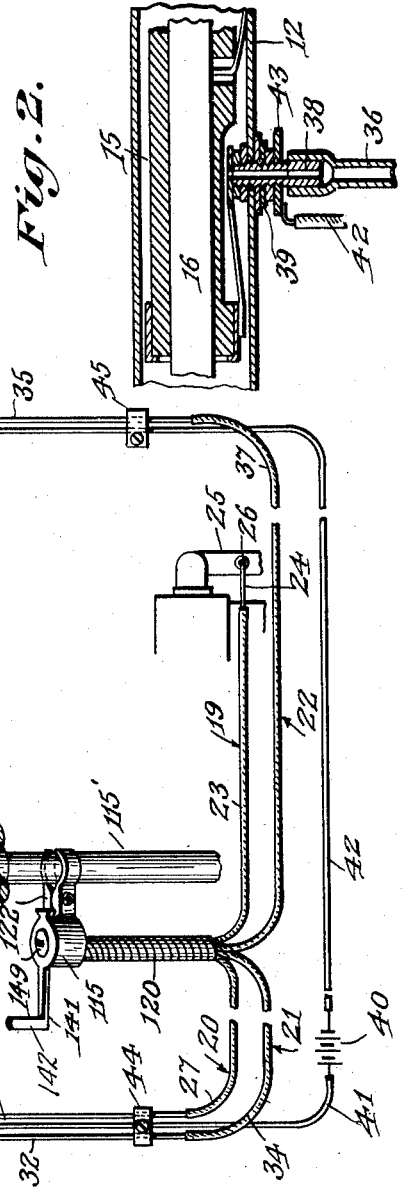
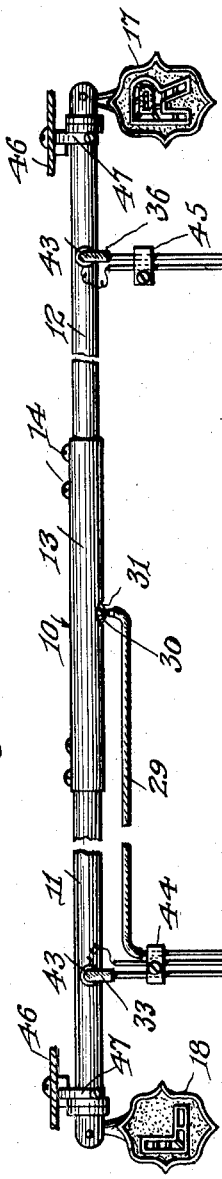
INVENTOR.
Carl F. Capell,
BY
Geo. P. Kimmel
ATTORNEY.

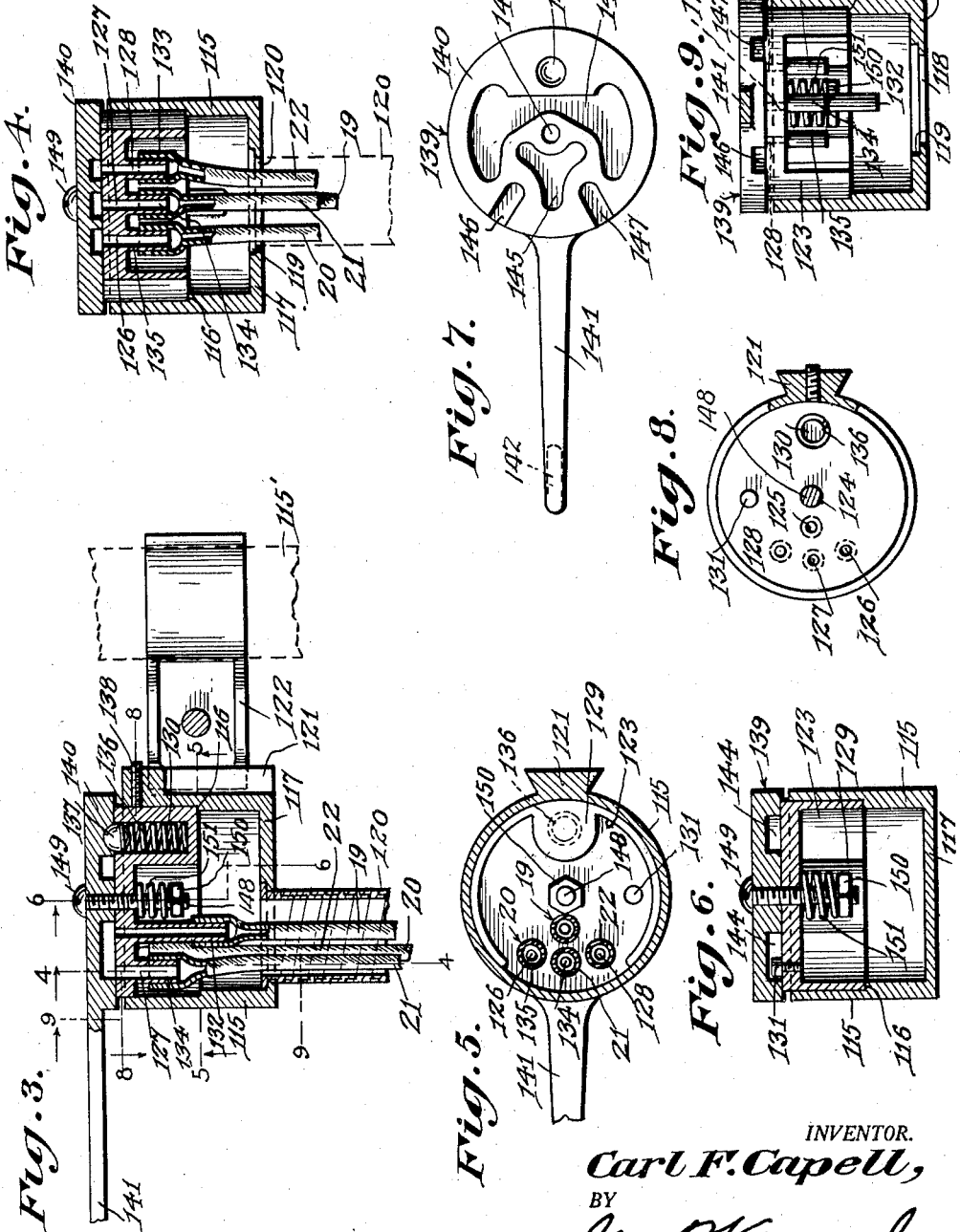

Patented Jan. 28, 1930

1,745,244

UNITED STATES PATENT OFFICE

CARL F. CAPELL, OF SANTA MONICA, CALIFORNIA, ASSIGNOR OF ONE-FOURTH TO HERBERT CUTLER BROWN, OF LOS ANGELES, CALIFORNIA

CONTROLLING MECHANISM FOR SIGNALS

Application filed April 1, 1929. Serial No. 351,732.

This invention relates to a controlling device for use in connection with that type of suction operated signalling apparatus employed for projecting and retracting signalling elements laterally with respect to the sides of the body of a motor vehicle to conspicuously indicate, during day or night and when occasion requires to the drivers of vehicles approaching from the front and rear the direction of turn, and has for its object to provide, in a manner as hereinafter set forth, a thoroughly efficient and conveniently operated device for controlling selectively the projecting and retracting movements of the signalling elements for the type of signalling apparatus referred to.

A further object of the invention is to provide, in a manner as hereinafter set forth, a controlling means for the purpose referred to capable of being operated by and with a minimum effort on the part of the driver of the vehicle in which said means is installed.

A further object of the invention is to provide, in a manner as hereinafter set forth, a device for the purpose referred to including means for permanently maintaining a horizontally shiftable, pivotally mounted, control lever in snug sliding engagement when in normal position, when shifted from and during the shifting thereof from normal position with a head common to a series of suction lines to prevent leakage, and further whereby said means will retain the lever in set position, take up the wear between the lever and head and permit of the shifting movement of the lever being had without friction to any material extent.

A further object of the invention is to provide, in a manner as hereinafter set forth, a device for the purpose referred to capable of being positioned in convenient reach of and operated by the driver without any inconvenience and without affecting in any manner the controlling of the car by the driver.

Further objects of the invention are to provide, in a manner as hereinafter set forth, a controlling device for the purpose referred to which is comparatively simple in its construction and arrangement, strong, durable, compact, thoroughly efficient in its use, conveniently installed in a motor vehicle and with respect to the signalling apparatus with which it is used, and comparatively inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claim hereunto appended.

In the drawings wherein like reference characters denote corresponding parts throughout the several views:

Figure 1 is a diagrammatic illustration of a suction operated signalling apparatus showing the adaption therewith of a controlling device therefor in accordance with this invention.

Figure 2 is a fragmentary view in longitudinal section illustrating one of the suction lines coupled at one end of the apparatus.

Figure 3 is a fragmentary view in vertical section of the controlling device and further illustrating the same coupled with the steering post of a motor vehicle and with the steering post illustrated in dotted lines.

Figure 4 is a section on line 4—4 Figure 3.
Figure 5 is a section on line 5—5 Figure 3.
Figure 6 is a section on line 6—6 Figure 3.
Figure 7 is an inverted plan view of the control lever.
Figure 8 is a section on line 8—8 Figure 3.
Figure 9 is a section on line 9—9 Figure 3.

A controlling device or mechanism, in accordance with this invention is employed in connection with a suction operated signalling mechanism and preferably of that type and structure as disclosed in my application Serial No. 348,852, filed March 21, 1929. It is to be understood however that the device or mechanism can be employed in connection with any type of suction operated signalling apparatus for which it is found applicable. The device or mechanism is illustrated, by way of example, with the housing of the signalling apparatus and a pair of projectable and retractable, illuminable signalling elements. The suction operated means for the signalling elements is arranged within the housing. No claim is made in this application to the housing, signalling elements, lighting circuits for the signalling elements, and a means controlled by suction for operating said elements and for closing the light circuit. The invention forming the subject matter of this application and which is claimed relates solely to a series of suction lines and a control for the latter and with the suction lines communicating with the housing of the signalling apparatus to provide, when said lines are controlled the projecting and retracting of the signalling elements.

By reference to Figure 1 a tubular housing is illustrated and indicated generally at 10 and which includes a pair of outer sections 11, 12 and an intermediate section 13. The outer sections 11, 12 are telescoped by the intermediate section 13 and adjustably connected therewith by the retaining means 14. Each outer section provides a suction chamber and in which operates a means, as indicated at 16 for projecting and retracting a signalling element. The signalling elements are designated 17 and 18. It is thought unnecessary to more specifically describe the housing 10 and signalling elements as the specific construction thereof is clearly defined in my application aforesaid and further such elements form no part of this invention and are not claimed. It will be stated, however, that each suction chamber has an inner wall to which is attached one of the suction lines of the controlling device, that is to say, one of the suction lines of the controlling device is common to both suction chambers and further each suction chamber has communicating therewith another suction line of the device and such point of communication is between the inner and outer ends of the chamber. The manner of the arrangement of the suction lines of the controlling device or mechanism, in accordance with this invention is clearly shown in Figure 1.

The controlling device or mechanism includes a primary suction line referred to generally at 19 and a series of auxiliary suction lines referred to generally at 20, 21 and 22. The primary suction line 19 comprises a length of rubber tubing 23 and a length of metallic, bendable tubing 24 which telescopes the rubber tubing 23 and is attached to the intake manifold 25 of the engine of the vehicle, as indicated at 26. The auxiliary suction line 20 comprises a section of rubber tubing 27, a section 28 formed from metallic tubing, a section 29 consisting of rubber tubing, and a pair of branches 30, 31 which are also formed of suitable tubing and lead from one end of the section 29.

The section 28 telescopes the sections 27 and 29. The auxiliary line 21 consists of a section of metallic tubing 32, a short rubber tubing section 33 and a rubber tubing section 34. The section 32 telescopes the sections 33, 34. The auxiliary suction line 32 comprises a section 35 formed of metallic tubing, a short section 36 of rubber tubing and an elongated section 37 of rubber tubing. The section 35 telescopes the sections 36, 37. The branches 30, 31 which extend from the section 29 of the line 20 are set up in the manner as disclosed in my application hereinbefore referred to. The branch 30 opens into the suction chamber 15 provided by the outer section 11 of the housing 10 and the branch 31 opens into the suction chamber 15 provided by the outer section 12 of the housing 10. The line 21, as well as the line 22, further includes a tubular metallic nipple which is secured to an outer section of the housing 10. The metallic nipples telescope the sections 33, 36 of the lines 21, 22. By reference to Figure 2 it discloses the arrangement of a tubular metallic nipple with respect to a rubber tube section 33 or 34. In Figure 2 the nipple is indicated at 38 and is fixedly secured to an outer section of the housing 10, as well as opens into the suction chamber 15 provided by such section. The nipple 38 is secured to the outer section of the housing in a manner as set forth in my application aforesaid. In Figure 2 the outer housing section is indicated at 12, the means for securing the nipple 38 to the section 12, is indicated at 39 and the short rubber tubing section is indicated at 36.

In Figure 1 of the drawings a source of electrical energy is indicated at 40 and circuit conductors at 41, 42 and each of the conductors has a terminal 43 for connection to a nipple 38. In Figure 2 a circuit conductor is indicated at 42 and the terminal which connects it to a nipple 38 at 43. The circuit conductors 41 and suction line sections 28 and 32 are connected together by clips or clamps 44. Suction line section 35 and circuit conductors 42 are connected together by clips or clamps 45. The sections 28, 32 and 35 of the suction lines are disposed vertically and positioned against the inner face of the front of the body of the automobile, at the sides of such face. The housing 10 is adapted to be connected to the visor 46 of the vehicle and the connecting means for the housing 10 is indicated at 47. The housing 10 is disposed transversely with respect to the front of the vehicle and is of a length whereby the signalling elements 17, 18 when retracted will be arranged in close proximity to the sides of the body of the vehicle. The arrangement of the housing 10 with respect to the visor 46 as well as the arrangement of the signalling elements 17, 18 is clearly illustrated in my application aforesaid.

The controlling device or mechanism not only includes the primary suction line 29 and the auxiliary suction lines 20, 21 and 22, but further includes a circular open top housing or casing formed with an internal, annular shoulder 116. The bottom of the housing is indicated at 117 and is formed with an opening 118 having the wall thereof shouldered, as at 119.

Connected with and depending from the bottom of the housing 115, is a tubular flexible shaft 120 which encloses the primary and auxiliary suction lines, that is to say, encloses a portion of the sections 23, 27, 34, 35 of the lines 19, 20, 21 and 22 respectively. The housing 115 is formed on its outer periphery with a vertically disposed, dovetailed tongue 121, engaged by an adjustable clamping device 122 for the purpose of coupling housing 115 with the steering column 115'.

Arranged within the housing 115 and seating on the shoulder 116, as well as projecting slightly above said housing 115, is a head element for the several suction lines. The head element is clearly shown in Figures 3, 4, 6 and 9. Said head element comprises a disk 123 formed with an axial opening 124, a series of openings 125, 126, 127 and 128. The lower face of the disk 123 is provided with a depending portion 129 having a socket 130, which opens at the upper face of the disk 123. Projecting from the upper face of the disk 123 is a stop pin 131. Integral with and depending from the lower face of the disk 123, are tubular extensions 132, 133, 134 and 135 which register with the openings 125, 126, 127 and 128 respectively. The primary suction line 19 is telescoped by the extension 132. The auxiliary suction line 20 is telescoped by the extension 135. The auxiliary line 21 is telescoped by the extension 134 and the auxiliary suction line 22 is telescoped by the extension 133.

Arranged within the socket 130 is a compression spring 136 which has a bearing ball 137 seated in the upper end thereof. The head element is clamped from movement within the housing 117 by the binding screw 138. See Figure 3. Mounted on the upper end of the head element for the suction lines is an oscillatory control lever therefor and said lever is referred to generally at 139, and consists of a disk 140 of a diameter corresponding to the diameter of the housing 115 and with the lever further including a handle member 141 having an upturned outer end 142 for facilitating the shifting thereof by the driver of the vehicle. The disk 140 centrally thereof is formed with an opening 142'. See Figure 7. The inner or lower face of the disk 140 is also provided with a recess 143 into which extends the bearing ball 137 for latching the control lever in normal position. The said inner or lower face of the disk 140 is further formed with a recess 144 having a narrow, intermediate portion and a pair of end portions disposed at an angle with respect to the intermediate portion.

Operating within the recess 144 is the stop pin 131 for limiting the shifting movement of the lever in either direction. The inner face of the disk 140 is further formed with a substantially triangular shaped pocket 145 having the walls thereof curved. The intermediate portion of the recess 144 is arranged between the opening 142 and the cavity or recess 143. The pocket 145 is arranged between the end portions of the recess 144 and the opposite side of the opening 142. The inner face of the disk 140 is furthermore provided with a pair of oppositely disposed, inclined grooves 146, 147 providing channels for communication with the atmosphere.

The control lever 139 is mounted on a vertically disposed pivot 148, having a head 149 at its upper end which overlaps the disk 140. The pivot 148 extends down through the openings 142 and 144 and is formed with peripheral threads. Secured to the pivot 148 is an adjusting nut 150 and interposed between the nut 150 and the disk 123, and surrounding the pivot 148 is a take-up spring 151 which constantly maintains the disk 140 in snug sliding engagement with the upper face of disk 123 to prevent leakage. The action of the spring 151 will provide a substantially air-tight seal between the disks 123 and 140, but will not retard an easy shift of the lever.

The opening 126 in disk 123 normally communicates with a groove 147 and the opening 128 in the disk 123 normally communicates with the groove 146. The opening 125 in disk 123 normally communicates with pocket 145, the latter being what is termed a by-pass. The opening 127 normally communicates with pocket 145 and is also adapted to communicate with either groove 146 or 147 when the control lever 139 is shifted from normal. The movement in either direction of the control lever is arrested by the stop pin 131 coacting with the walls of the recess 144. The spring 151 furthermore constitutes a take-up device to compensate for the wear between the opposed faces of the disks 123 and 140. Owing to the manner of setting up the control lever relative to the head element, the opposed faces thereof being flat, friction is reduced to a minimum and the shifting of the lever is conveniently had by the operator of the car.

The primary suction line 19 and auxiliary suction line 20 normally communicate with the pocket 145. When the control valve is shifted in a clock-wise direction the suction line 21 communicates with pocket 145, suction line 20 communicates with the atmosphere through channel 147 and suction line 22 communicates with recess 144 and is closed to the atmosphere. When the control lever is shifted in an anti-clock-wise direction from the normal position of lines 19 and 20, suction line 22 is brought into communication with pocket 145, suction line 20 communicates with the atmosphere through channel 147, suction line 21 communicates with recess 144 and is closed to the atmosphere. The normal position of suction lines 20, 21 and 22 is in registration with grooves or channels 146, 147 respectively, whereby such lines are open to the atmosphere. When suction line 21 is active, the suction is applied to the forward portion of the chamber formed in the housing section 11 and the rear portion of such chamber is in communication with the atmosphere. When suction line 22 is active suction is applied to the forward portion of the chamber formed in the housing section 12 and the rear portion of such chamber is in communication with the atmosphere. When suction lines 21 and 22 are inactive, suction line 20 which is common to both suction chambers acts to provide suction on the inner portions of the chambers whereby the signalling elements are maintained in retracted position. When suction line 21 becomes active then the signalling element 18 is projected, but when it is projected the signalling element 17 remains retracted. When suction line 22 is active it causes the projection of signalling element 17, but signalling element 18 remains retracted.

It is thought the many advantages of a controlling device or mechanism for the purpose set forth and in accordance with this invention, can be readily understood, and although the preferred embodiment of the invention is as illustrated and described, yet it is to be understood that changes in the details of construction can be had which fall within the scope of the invention as claimed.

What I claim is:

1. In a controlling device for the purpose set forth, a casing having an internal shoulder approximately centrally thereof, a head element common to a primary suction line and a series of auxiliary suction lines, said head element arranged within and extended above the casing and seated on such shoulder, means for retaining said head element stationary within said casing, said element provided with an opening and a depending tubular extension registering with the opening and adapted to be coupled to the primary suction line, and said element further formed with a series of openings and a series of spaced, depending tubular extensions registering with such openings and each adapted to be coupled to an auxiliary suction line, said extensions housed by said head.

2. In a controlling device for the purpose set forth, a casing having an internal shoulder approximately centrally thereof, a head element common to a primary suction line and a series of auxiliary suction lines, said head element arranged within and extended above the casing and seated on such shoulder, means for retaining said head element stationary within said casing, said element provided with an opening and a depending tubular extension registering with the opening and adapted to be coupled to the primary suction line, said element further formed with a series of openings and a series of spaced, depending tubular extensions registering with such openings and each adapted to be coupled to an auxiliary suction line, said extensions housed by said head and a resiliently connected control lever mounted on the top of said head element and having means opposing the top of the head element for establishing communication selectively between the tubular extension to which the primary suction line is connected and the tubular extensions to which the auxiliary suction lines are connected, said means further providing for selectively closing and opening said series of extensions from and to the atmosphere.

3. In a controlling device for the purpose set forth, a casing having an internal shoulder approximately centrally thereof, a head element common to a primary suction line and a series of auxiliary suction lines, said head element arranged within and extended above the casing and seated on such shoulder, means for retaining said head element stationary within said casing, said element provided with an opening and a depending tubular extension registering with the opening and adapted to be coupled to the primary suction line, said element further formed with a series of openings and a series of spaced, depending tubular extensions registering with such openings and each adapted to be coupled to an auxiliary suction line, said extensions housed by said head, a resiliently connected control lever mounted on the top of said head element and having means opposing the top of the head element for establishing communication selectively between the tubular extension to which the primary suction line is connected and the tubular extensions to which the auxiliary suction lines are connected, said means further providing for selectively closing and opening said series of extensions from and to the atmosphere, and means carried by the head element and engaging in said means opposing the top of the head element for limiting the movement of the lever in either direction.

4. In a controlling device for the purpose set forth, a casing having an internal shoulder approximately centrally thereof, a head element common to a primary suction line and a series of auxiliary suction lines, said head element arranged within and extended above the casing and seated on such shoulder, means for retaining said head element stationary within said casing, said element provided with an opening and a depending tubular extension registering with the opening and adapted to be coupled to the primary suction line, said element further formed with a series of openings and a series of spaced, depending tubular extensions registering with such openings and each adapted to be coupled to an auxiliary suction line, said extensions housed by said head, a resiliently connected control lever mounted on the top of said head element and having means opposing the top of the head element for establishing communication selectively between the tubular extension to which the primary suction line is connected and the tubular extensions to which the auxiliary suction lines are connected, said means further providing for selectively closing and opening said series of extensions from and to the atmosphere, means carried by the head element and engaging in said means opposing the top of the head element for limiting the movement of the lever in either direction, and spring controlled means carried by and extending from the top of the head element to provide a bearing for said control lever and further providing for latching said lever in normal position.

5. In a controlling device for the purpose set forth, a casing having an internal shoulder approximately centrally thereof, a head element common to a primary suction line and a series of auxiliary suction lines, said head element arranged within and extended above the casing and seated on such shoulder, means for retaining said head element stationary within said casing, said element provided with an opening and a depending tubular extension registering with the opening and adapted to be coupled to the primary suction line, said element further formed with a series of openings and a series of spaced, depending tubular extensions registering with such openings and each adapted to be coupled to an auxiliary suction line, said extensions housed by said head, a resiliently connected control lever mounted on the top of said head element and having means opposing the top of the head element for establishing communication selectively between the tubular extension to which the primary suction line is connected and the tubular extensions to which the auxiliary suction lines are connected, said means further providing for selectively closing and opening said series of extensions from and to the atmosphere, means carried by the head element and engaging in said means opposing the top of that head element for limiting the movement of the lever in either direction, and spring controlled means carried by and extending from the top of the head element to provide a bearing for said control lever and further providing for latching said lever in normal position, said casing having its bottom provided with an opening for the passage of the suction lines to said extensions.

6. A controlling device for the purpose set forth comprising a primary and a series of auxiliary suction lines, a head element common to and into which said lines open, a horizontally operable control lever seated on and resiliently connected to said element and having means in its inner face for selectively establishing communication between the primary suction line and said auxiliary suction lines, said means further providing for selectively closing and opening said auxiliary suction lines from and to the atmosphere, and a spring controlled bearing interposed between said lever and said head element.

7. A controlling device for the purpose set forth comprising a primary and a series of auxiliary suction lines, a head element common to and into which said lines open, a horizontally operable control lever seated on and resiliently connected to said element and having means in its inner face for selectively establishing communication between the primary suction line and said auxiliary suction lines, said means further providing for selectively closing and opening said auxiliary suction lines from and to the atmosphere, a spring controlled bearing interposed between said lever and said head element, said bearing further engageable into said lever for latching it in normal position, a casing supporting said head element, said head element extending above said casing, means for retaining said head element stationary within the casing, and said casing having its bottom provided with an opening for the passage of said suction lines to the head element.

8. A controlling device for the purpose set forth comprising a head element having means to provide a series of suction passages, a primary suction line opening into one of said passages, a series of auxiliary suction lines opening into the other of said passages, shiftable means resiliently connected to and having its inner face riding against said head and with its inner face recessed, channelled and formed with a pocket for selectively establishing communication between said primary suction line and said auxiliary suction lines and further providing for selectively closing and opening said auxiliary suction lines from and to the atmosphere, and a spring controlled bearing interposed between the last mentioned means and the head element.

9. A controlling device for the purpose set forth comprising a head element having means to provide a series of suction passages, a primary suction line opening into one of said passages, a series of auxiliary suction lines opening into the other of said passages, shiftable means resiliently connected to and having its inner face riding against said head and with its inner face recessed, channelled and formed with a pocket for selectively establishing communication between said primary suction line and said auxiliary suction lines and further providing for selectively closing and opening said auxiliary suction lines from and to the atmosphere, a spring controlled bearing interposed between the last mentioned means and the head element, and means for supporting said head element stationary.

In testimony whereof, I affix my signature hereto.

CARL F. CAPELL.